INVENTORS
LEWIS C. MC CARTY JR
HAROLD G. FELIO
BY George H. Mitchell
ATTORNEY

INVENTORS
LEWIS C. MC CARTY JR.
HAROLD G. FELIO
BY George H. Mitchell
ATTORNEY

AIRBORNE LIFEBOAT

INVENTORS
LEWIS C. MC CARTY JR.
HAROLD G. FELIO
BY George H. Mitchell
ATTORNEY

Aug. 17, 1954 L. C. McCARTY, JR., ET AL 2,686,323

AIRBORNE LIFEBOAT

Filed Aug. 18, 1949 7 Sheets-Sheet 4

INVENTORS
LEWIS C. MC CARTY JR.
HAROLD G. FELIO
BY George H. Mitchell
ATTORNEY

INVENTORS
LEWIS C. MC CARTY JR.
HAROLD G. FELIO
BY George H. Mitchell
ATTORNEY

AIRBORNE LIFEBOAT

Filed Aug. 18, 1949

INVENTORS
LEWIS C. MC CARTY JR.
HAROLD G. FELIO
BY George H. Mitchell
ATTORNEY

Aug. 17, 1954 L. C. McCARTY, JR., ET AL 2,686,323

AIRBORNE LIFEBOAT

Filed Aug. 18, 1949 7 Sheets-Sheet 7

INVENTORS
LEWIS C. MC CARTY JR.
HAROLD G FELIO

BY George H. Mitchell

ATTORNEY

Patented Aug. 17, 1954 2,686,323

UNITED STATES PATENT OFFICE 2,686,323

AIRBORNE LIFEBOAT

Lewis C. McCarty, Jr., and Harold G. Felio, New York, N. Y., assignors to The Marine Aircraft Corporation, New York, N. Y., a corporation of New York Application August 18, 1949, Serial No. 111,048

13 Claims. (Cl. 9—3)

This invention is a lifeboat particularly adapted to be dropped from a rescue aircraft into the water, preferably from a relatively low altitude, for the rescue of persons in distress in bodies of water, either as the result of a marine accident or the result of an airplane having been forced down. Such a lifeboat could be launched from a surface vessel, but it is especially adapted to be carried by and launched from rescue aircraft, and it will be described particularly in connection with such use.

It has been the practice in seeking to rescue personnel ditched at sea, for a rescue aircraft to carry a lifeboat, equipped with one or more parachutes, to the scene of the disaster, and to drop the lifeboat, necessarily from a considerable altitude, in order to give time for the parachutes to open. Such parachutes are necessarily large and expensive, wind drift makes the drops inaccurate, and even with their use, sometimes the lifeboat is wrecked or broken upon impact with the water.

The principal object of the present invention is to provide a lifeboat which is foldable, and, in folded position, forms a compact, stream-lined unit or "package," which may be carried on shipboard or may be attached to rescue aircraft externally, as beneath the wing or carried internally, as in the bomb bay or cargo compartment. The boat is carried to the scene of the disaster in folded position by the search and rescue aircraft, and accurately launched at a relatively low altitude from such aircraft, so that it will descend at a controlled attitude to and into the water, in the near vicinity of the survivors, taking a shallow dive or perhaps skipping along the water as it decelerates. After the boat is in the water, it is automatically inflated and unfolded, for increasing the beam and buoyancy and seaworthiness of the boat. A parachute could be used to decrease rate of descent if desired, but it is not necessary.

Another important feature of the invention is to provide an air borne lifeboat, one or two of which can be carried below the wings of military aircraft, in much the same manner that a bomb or torpedo is carried in the usual bomb racks, the stream-lined lifeboat "package" presenting a carrying problem no more difficult than that of carrying a torpedo or similarly streamlined large bomb. The lifeboat may be attached and released by conventional and known bomb rack mechanism. The stream-lined contour of the boat minimizes head resistance and drag in flight, and minimizes the shock of impact with the water. Bracing to resist side swing in flight may be used if desired.

Another important feature of the invention is the method of decelerating the boat during its launching drop. The boat, as just stated, may be carried on a conventional bomb rack provided with the usual electrical and mechanical release mechanism. The lifeboat is provided with a drogue and attaching cable. When it is desired to drop the boat, the drogue is ejected mechanically or electrically by operation of a suitable control in the carrier aircraft. The drogue sinks into the water, and due to the resistance to the forward motion of the drogue which is offered by the water, the drogue cable operates the bomb release mechanism and so releases the lifeboat. The boat could also be released from the rescue aircraft by a timing device or by manual operation of the release mechanism. The drogue cable is normally provided with a bridle which connects to the lifeboat on either side of its center of gravity, so that the lifeboat is not only decelerated from the relatively high speed at which it leaves the rescue aircraft, but is also caused to descend at a controlled and stabilized attitude. The air path of the boat may be further stabilized by tail fins, one of which serves also to fair in the propeller and rudder. These tail fins are jettisoned after the boat is in the water.

Shortly after the boat is in the water, compressed gas from one or more cylinders, the release of which is effected by a timing mechanism, or by radio control from the carrier aircraft, or by survivors, serves to inflat sponsons, causing the boat to unfold laterally to port and starboard to increase its effective beam and displacement.

The flexible airtight membranes forming the sponsons are held snugly and tightly in place while it is in the air and while it enters the water.

At the same time that this lateral unfolding is accomplished, inflatable righting chambers or hoods carried at the bow and stern of the boat are also inflated. Such hoods, in addition to their function of righting the boat in case it should be overturned by rough seas, also provide shelter for survivors that are picked up by the boat. These hoods, in folded position, may be covered with nylon fabric as a protection and with a rigid fairing to insure aerodynamic and hydrodynamic efficiency. This fairing is jettisoned when the hoods are inflated.

The inflatable sponsons of the boat are provided with flexible elastic partitions for localizing the effect of a rupture. If one compartment is ruptured, the adjacent flexible partition will expand and bend into the puctured compartment and take over part of its load. Auxiliary hand pumps included in the lifeboat equipment permit building up a higher pressure in the compartments adjacent to the ruptured compartment in order to expand the partitions in this manner.

The boat is provided with a power plant, propeller and rudder, the propeller and rudder being protected in flight and on water impact by fin-like fairings. The righting hoods at the bow and stern, when in folded position, are covered and protected by rigid fairings so that the entire boat, as mentioned, is compact and streamlined for easy transportation to the scene of the disaster. The stream-lined shape, in cooperation with the drogue and fins, enables the boat to descend into the water at a glide attitude. The bow fairings may be designed to cushion or absorb a portion of the impact when the boat hits the water.

The engine, in addition to being provided with conventional operating mechanism, is also provided with means whereby it is controlled by radio from the rescue aircraft, so that after the boat is in the water, either inflated or deflated, the engine can be started and the boat steered close to the ditched personnel so that they may readily climb aboard. In order to aid the survivors to climb aboard, rope ladders or life lines are provided, which extend into the water or are within the reach of survivors when the sponsons are inflated.

The rigid portion of the lifeboat comprises a water tight hull and flush deck so that even in the folded or deflated position, it will float and even in such deflated position, could serve to rescue survivors. However, as above stated, the seaworthiness and carrying capacity of the boat will of course be greatly increased when it is inflated. Survivors who have climbed aboard will be able to open up one or more water tight hatches in the dack for obtaining access to the engine and to the essential supplies of food, water, medicine and other equipment which would be carried by the lifeboat. The boat would carry a substantial amount of engine fuel, preferably in two bladder type fuel tanks, equipped with a selector valve so the fuel may be drawn from either tank.

Coming now to probably the most important structural feature of the boat, there is pivoted at or near each outer edge of the deck, and extending for a substantial distance fore and aft of amidships, a hollow, rigid, box-like stiffener member, these two box members being swingable inwardly to the folded position and swingable outwardly to the unfolded position. When in the folded position, one face of each box-like member is locked to the deck. The unfolding is accomplished by the inflation of the sponsons, which cause these box members to unlock, and to swing about 180°, so to extend laterally to port and starboard, being held in such unfolded position by the sponsons, plus supplemental locks if desired. The upper edge of the flexible membranes of a sponson is secured to the lower inner edge of one of these box members, considered in the folded position, that is, when it is against the deck, while the other or lower edge of this membrane is secured to the lower portion of the hull, a little above the keel. When the parts are in folded position this membrane is stretched snugly up from its lower edge, tight against the hull and then extends around the box member, and then down to its point of attachment, as described, being subjected to considerable tension throughout. When air or gas is released into the sponsons, the folded position lock is retracted, the membrane pulls the box member outwardly and swings it so that it extends substantially horizontally outwardly of the deck, increasing the beam of the boat considerably. The inflated sponsons hold these box members in this position and the sponsons in turn extend still further outwardly, giving increased stability and deck space for survivors and carrying capacity to the boat. The box members may be locked in their extended position to insure a rigid deck surface. The sponsons may be single walled or double walled. If double walled, the inner wall, in inflated position, is tight against the hull, then extends under and around the outer part of the corresponding box member to the line of attachment to the box member.

The midship portion of the boat, between the righting hoods at bow and stern, is provided with foldable gunwales, which when the boat is folded, lie flat against the deck, under the folded box members, but which may be swung up and latched in vertical position at the outboard edges of the extended deck for providing additional protection in rough weather.

As mentioned above, the inflated righting chambers at bow and stern provide shelter for the survivors, and the open ends of these hoods may be provided with storm curtains which may be open or closed, as by slide fasteners or the like, for protection against the weather. Nylon netting may be used with deck tie down points to secure injured personnel against further injury during rough weather. Navigating lights and a radio set may be installed.

The midship portion of the boat, between the hoods, may be provided with a tarpaulin or the like for additional protection from cold, water and sun.

Further features and advantages of the invention will be described in connection with the accompanying drawings, wherein.

Figures 7, 16:
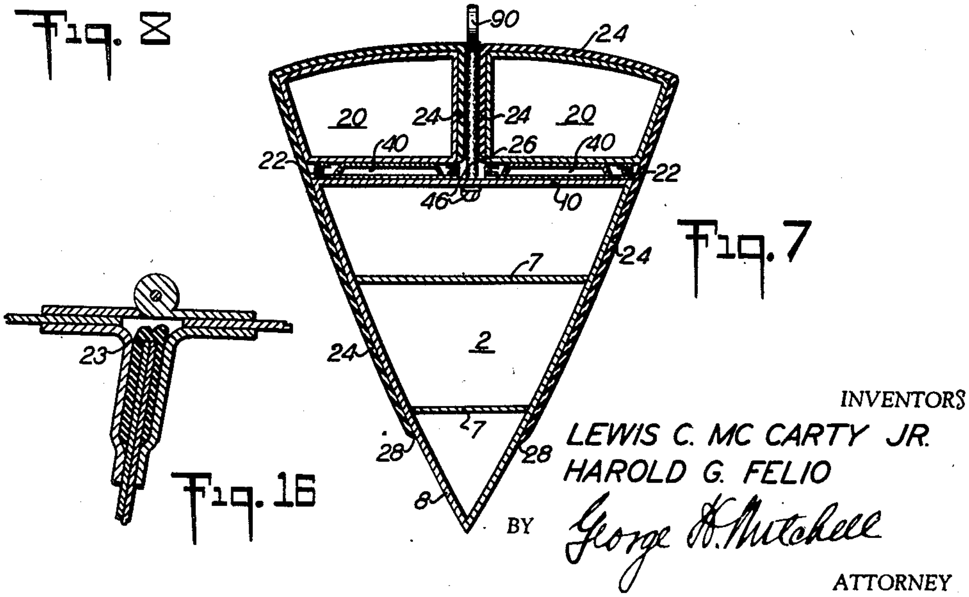
Fig. 7 is an enlarged cross section of the boat, at about the middle thereof, in folded, deflated position.
Fig. 16 is a sectional view of a detail.
Figure 9:
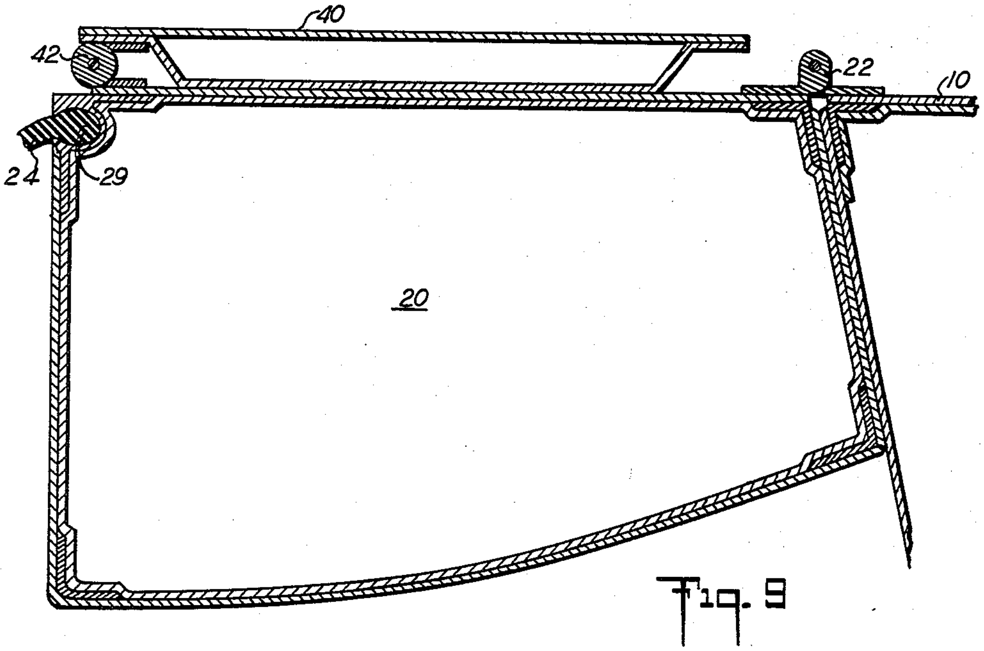
Fig. 9 is an enlarged, fragmentary cross section, taken on line 9—9 of Fig. 6.

Referring now to these drawings, which are largely diagrammatic, the boat comprises a rigid hull indicated generally at 2, approximately triangular in cross section and including side walls 4 and 6, horizontal braces 7, Fig. 7, keel portion 8 and deck 10. The hull is tapered at the bow and stern and is provided with a number of watertight compartments, some of which may be sealed airtight for assuring buoyancy and others of which are provided with water tight doors, and which carry the usual equipment of lifeboats, such as water, food, clothing, a radio set, fuel for the engine, etc. The engine 12 is connected to drive the two bladed propeller 14; a conventional rudder is shown at 16. The deck 10 is provided with one or more readily operable watertight hatches 18, which may be opened from the top of the deck. The engine is provided with means for controlling it by radio as well as with manual control. The rudder may also be controlled by radio or manually. Such ratio control is well known in the art.

Figure 8:
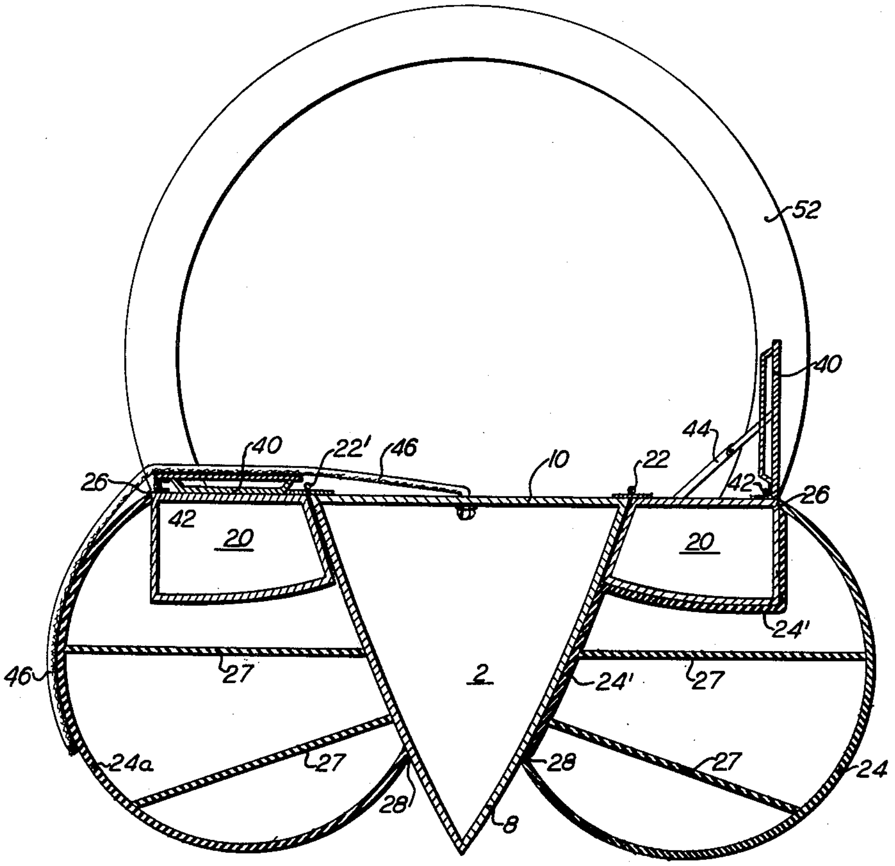
Fig. 8 is a similar cross section, in unfolded and inflated position.

Coming now to an important feature of the invention, the boat is provided with longitudinally extending box-like members 20, which are hinged to the deck, at or near the outer edges thereof, on hinge axes 22, to swing inwardly to the folded position, Fig. 7, and outwardly to the unfolded position, Fig. 8. The hinge axes 22 extend longitudinally of the hull, for nearly the full length thereof, to about the points 22′.

An airtight, flexible, inflatable membrane or sponson 24, single or double walled, has its upper edge secured at 26 to the lower, inner portion of box 20, and its lower edge secured at 28 to the lower part of the hull. Membrane 24 is strong, tough, airtight; flexible elastic, longitudinally extending partitions 27 are provided to divide the sponson into compartments, for thereby localizing the effect of a puncture to one compartment. Transverse partitions could be used if desired, in place of or in conjunction with partitions 27.

When in folded position, each sponson 24 is snug against the hull, as in Fig. 8, and fits snugly over and around its box 20, thereby taking up very little space and minimizing drag in air and water. The weight and displacement of the boat, even with the sponsons deflated, is such that it will float, rather low in the water, so that its visibility would be low. This is valuable in wartime, because the boat, still deflated, can have its engine started by radio and steered to the rescue area.

Where a sponson of double wall is used, the inner wall 24′ fits against the hull and against the underside of box 20, and continues to point of attachment 26, as at the right of Fig. 8. Where a single thickness is used, the sponson wall 24*a* would extend from box to hull, as at the left of Fig. 8. In order to seal the hinge joint at 22′ gas tight, a flexible, foldable seal 23, Fig. 16, is provided, which would in all positions seal the hinge joint.

Whether a double walled sponson 24 or single walled sponson 24*a* is used, the upper and lower edges, at 26 and 28 may be provided with a heavy beaded edge 29, anchored gas tight in sockets 29*a* in boxes 20. Similar sockets may be provided in the hull at 28 for anchoring the lower beaded edges of sponsons 24 or 24*a*.

When the sponsons are inflated, boxes 20 are swung laterally and outwardly about 180° by the resulting pull of the sponsons, to the unfolded position shown in Fig. 8. Boxes 20 are airtight and could be used to carry supplies, in which case watertight doors could be provided for permitting access thereto. Boxes 20 have a stiffening or bracing effect; this stiffening effect could be achieved by making the members 20 simply as flat members, instead of hollow. In either case, the effect is to provide about double the deck space in the unfolded position. Locks or latches could be provided, if desired, to hold the boxes 20 in the folded and unfolded positions of Figs. 7 and 8.

The sponsons 24 are inflated from a number of flasks 30 of compressed air or gas, carried in the hull, each flask having a valve 32 and pipes 34 connecting it to one or more compartments in the sponsons. The valves 32 may be opened by one or more of the following known devices: by a timing device, set to open the valves about 20 or 30 seconds after launching; by radio control from the rescue aircraft; by a device operative upon contact with the water; manually, by a rescued person, who has reached the boat and climbed aboard. All of such valve opening devices could be used, if desired.

Foldable, double-walled gunwales 40 may be provided, hinged at 42 to the members 20; in folded position, the gunwales lie against the deck 10 and are swung to the vertical position manually by persons who have reached the boat. Hinged, lockable braces 44 serve to hold the gunwales in such position. Life lines or rope ladders 46 may be provided for aiding survivors to climb aboard. Rope ladder 46 may be secured at its upper end to the deck, and in folded position could be stowed between the members 20, with its outer end attached to the sponson, so that it would unfold with the sponson, to the position at the left of Fig. 8, where it is accessible to a person in the water.

The bow and stern of the boat are provided with foldable, inflatable, double-walled righting hoods 50 and 52, extending from the ends of the bow and stern to the positions indicated by their inner ends 50′ and 52′. These hoods are preferably compartmented to localize the effect of a possible puncture and are inflated from one or more flasks 30, Fig. 13, carrying compressed air or gas, controlled by release valves 32, such valves being controlled by one or more, or all of the following: timing devices; by radio from the carrier aircraft; by a device operable by contact with the water, or manually by a survivor who has climbed aboard.

These hoods, in folded position, lie flat against the deck and are protected by strong fairings 54, so as to streamline the boat and to protect the hoods when the boat reaches the water. The fairings 54 are arched and have a cushioning effect against water impact.

The propeller 14 and rudder 16 are also protected by double walled fairings 56.

Figure 10:
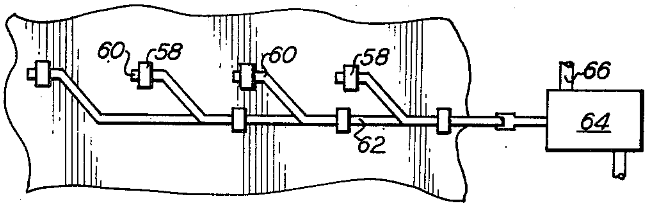
Fig. 10 is a view of a form of releasable latch for the fairings.

The fairings 54 and 56 are held in place by quick release latches or couplings of any desired type, as shown for example in Fig. 10, including rings or eyes 58 carried by the fairing, through which pass latch fingers 60, carried by a control rod 62, which when pulled longitudinally by a pull device 64, operated by springs or compressed gas, release the eyes 58, for thereby jettisoning the fairings. The shear pins or breakable links may also be used to effect jettisoning of these fairings after the water entry.

The boat is provided at its stern with tail fins 70, secured to the boat by any convenient form of quick release means, such as the eyes 58, latch fingers 60 and control rod 62, so that these tail fins may also be jettisoned similarly to the rigid fairings.

The release devices 64 for the fairings and fins, are preferably operated by gas under pressure from pipe 66, from one of the flasks 30, so that the fairings and fins are definitely jettisoned prior to inflation of the sponsons and righting hoods.

Figure 11:
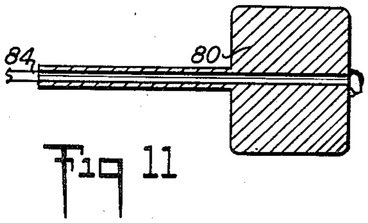
Fig. 11 is a side view of one form of drogue.
Figure 12:
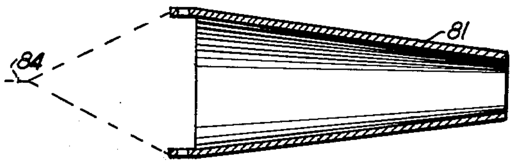
Fig. 12 is a side view of another form of drogue.

In order to decelerate the speed of the boat just after it is released from the carrier aircraft, and to aid in controlling the attitude of the boat during its descent toward the water, the lifeboat is provided with a drogue 80, Fig. 11, housed in a chamber 82 at the stern of the boat, the exit opening of which is shown at 83. The drogue carries a cable 84, the forward end of which is connected to the boat at a suitable point, such for example, at a point 86 just ahead of the center of gravity of the boat, or to a bridle attached to the boat at two or more points just ahead of the center of gravity. One or more additional drogues 80, Fig. 14, may be used if desired. The purpose of the drogue is to drag in the water and so to create a pull, which when applied to the boat at 86, decelerates the boat and acts to control the attitude of the boat for entry into the water. The drogue may be of any desirable shape, cylindrical for example, and heavy enough to sink in the water to create a drag. An open-ended drogue 81, Fig. 12, shaped like a windsock could be used, the cable 84' of which is attached to the boat. The drogue is ejected from its chamber 82 by an ejector 88, which may be a spring, explosive cartridge or solenoid, operated by a cable or wire from the rescue aircraft. The drag of the drogue cable, in cooperation with the tail fins, causes the boat to assume a controlled glide attitude, as in Fig. 13, so that it descends toward the water surface at an angle to encounter minimum water resistance.

One or more of the lifeboats is carried on the underside of the wings of an airplane or in the bomb bay, mounted by rings 90 on bomb racks or other suitable release structure, as well understood in the art of carrying and releasing bombs and torpedoes. One type of bomb release rack that might be used is the Mark VIII type.

Figure 4:
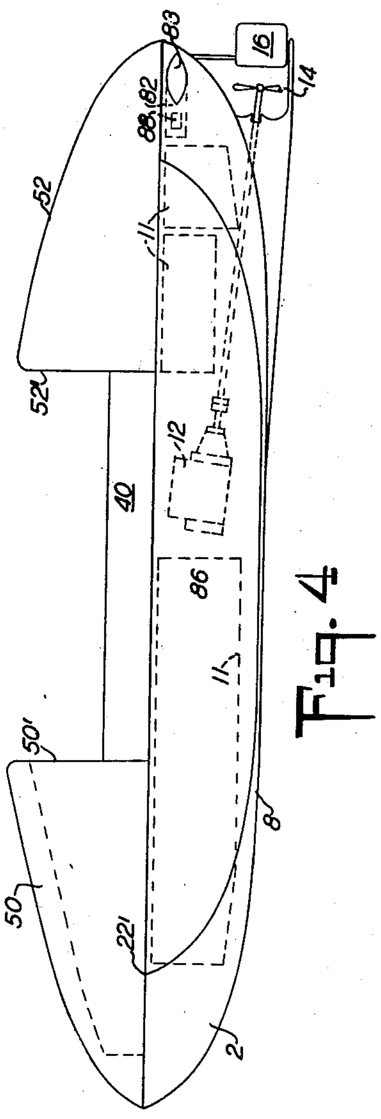
Fig. 4 is a side elevation of the lifeboat, in unfolded and inflated condition.
Figure 5:
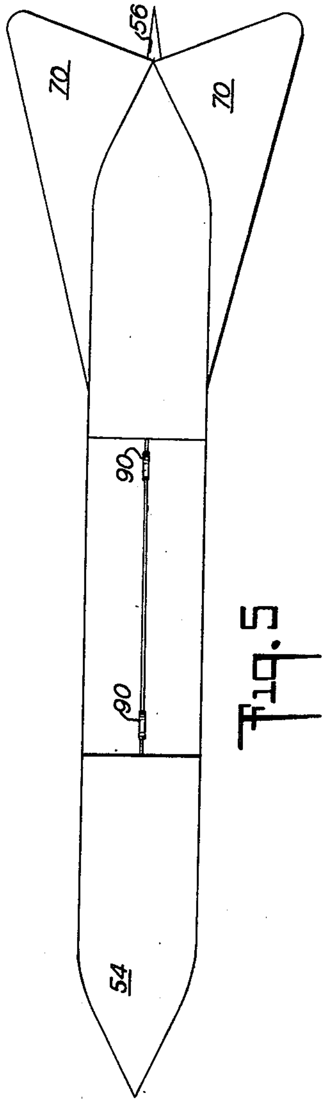
Fig. 5 is a plan view of the lifeboat in folded, deflated position.
Figure 6:
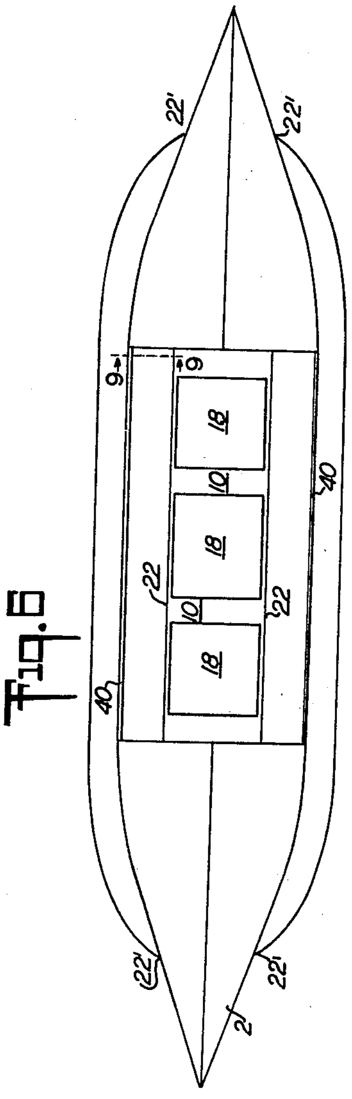
Fig. 6 is a plan view of the lifeboat in unfolded, inflated position.
Figure 13:
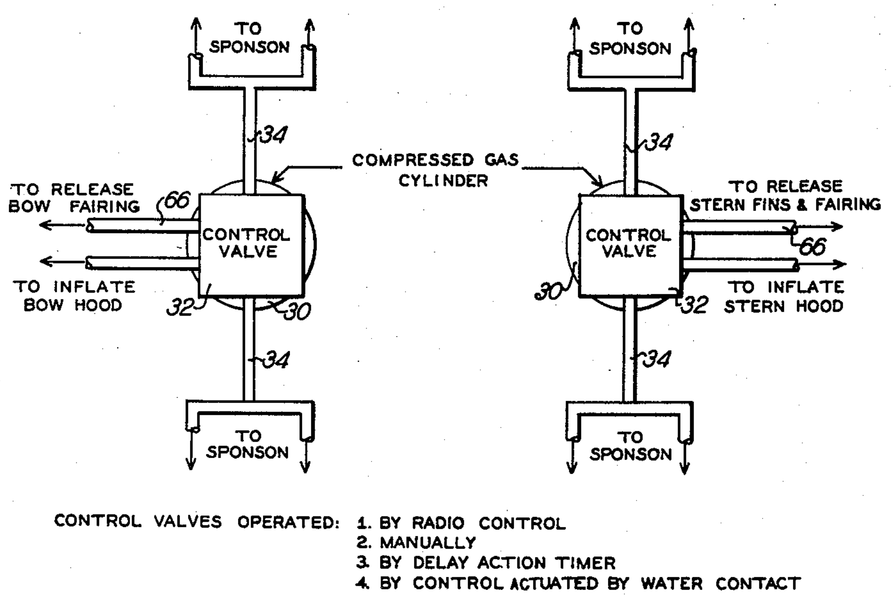
Fig. 13 is a diagram showing the compressed gas cylinders and cooperating valves and pipes.
Figure 14:
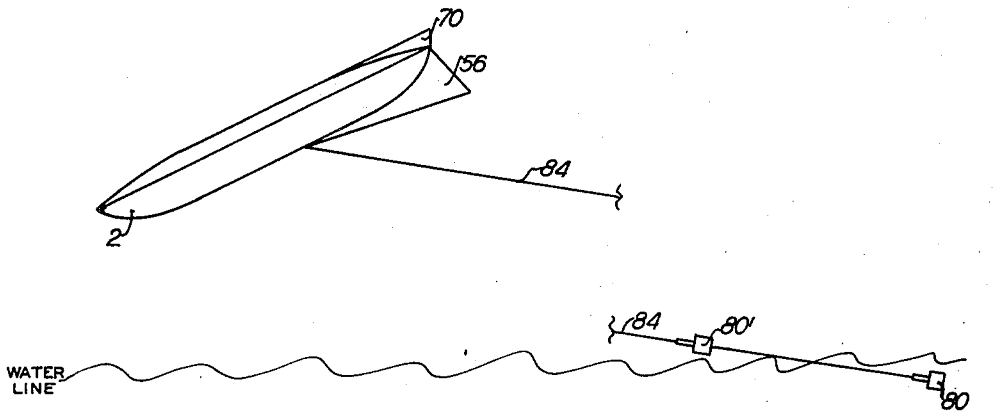
Fig. 14 shows the lifeboat descending in a glide attitude.
Figure 15:
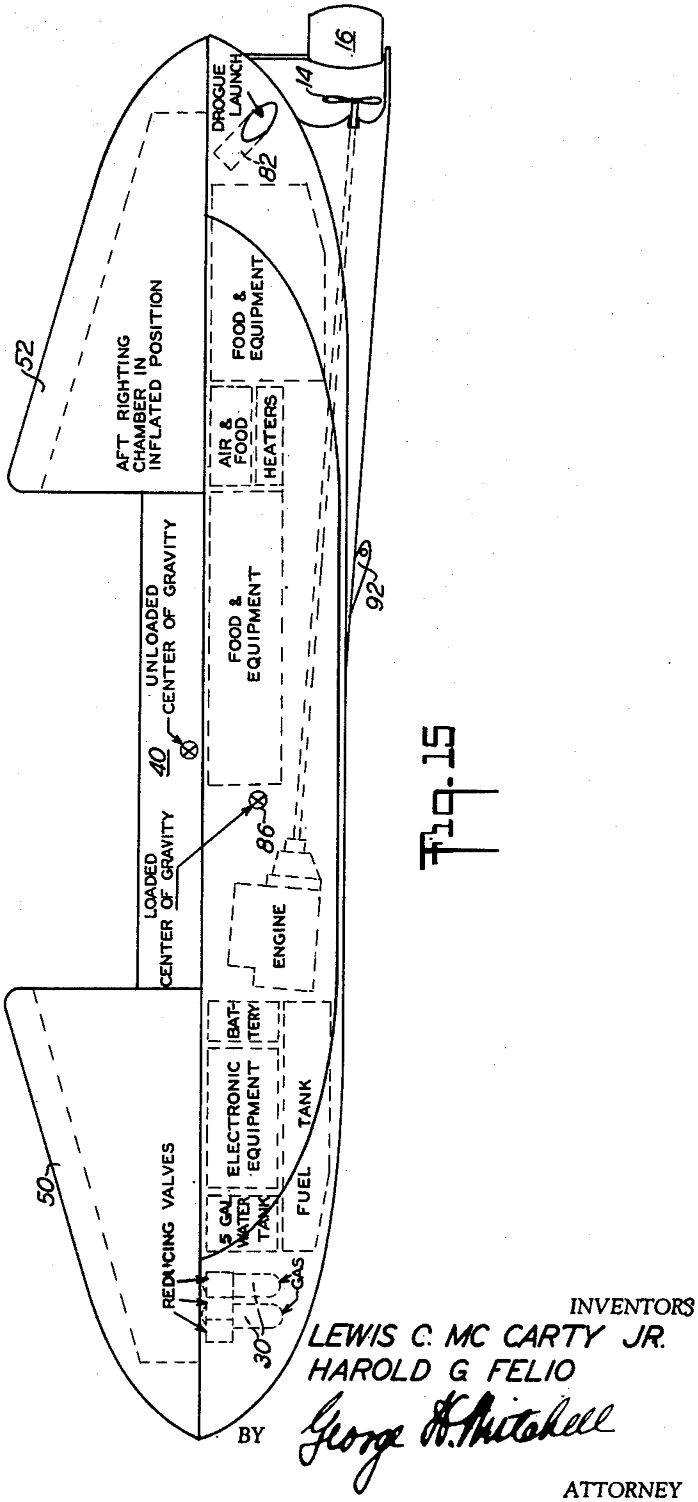
Fig. 15 is a side view of the lifeboat in inflated condition, showing some modifications.

Fig. 13 shows in diagrammatic side view the interior arrangement of the boat, the engine 12' being placed farther forward than in Fig. 4. The center of gravity is at about the point 86'. The front end of the drogue cable could be attached to either side of the hull, a little ahead of point 86', or it could be attached to the bracket 92 extending from the keel.

*Summary of structure and operation*

Figures 1, 2:
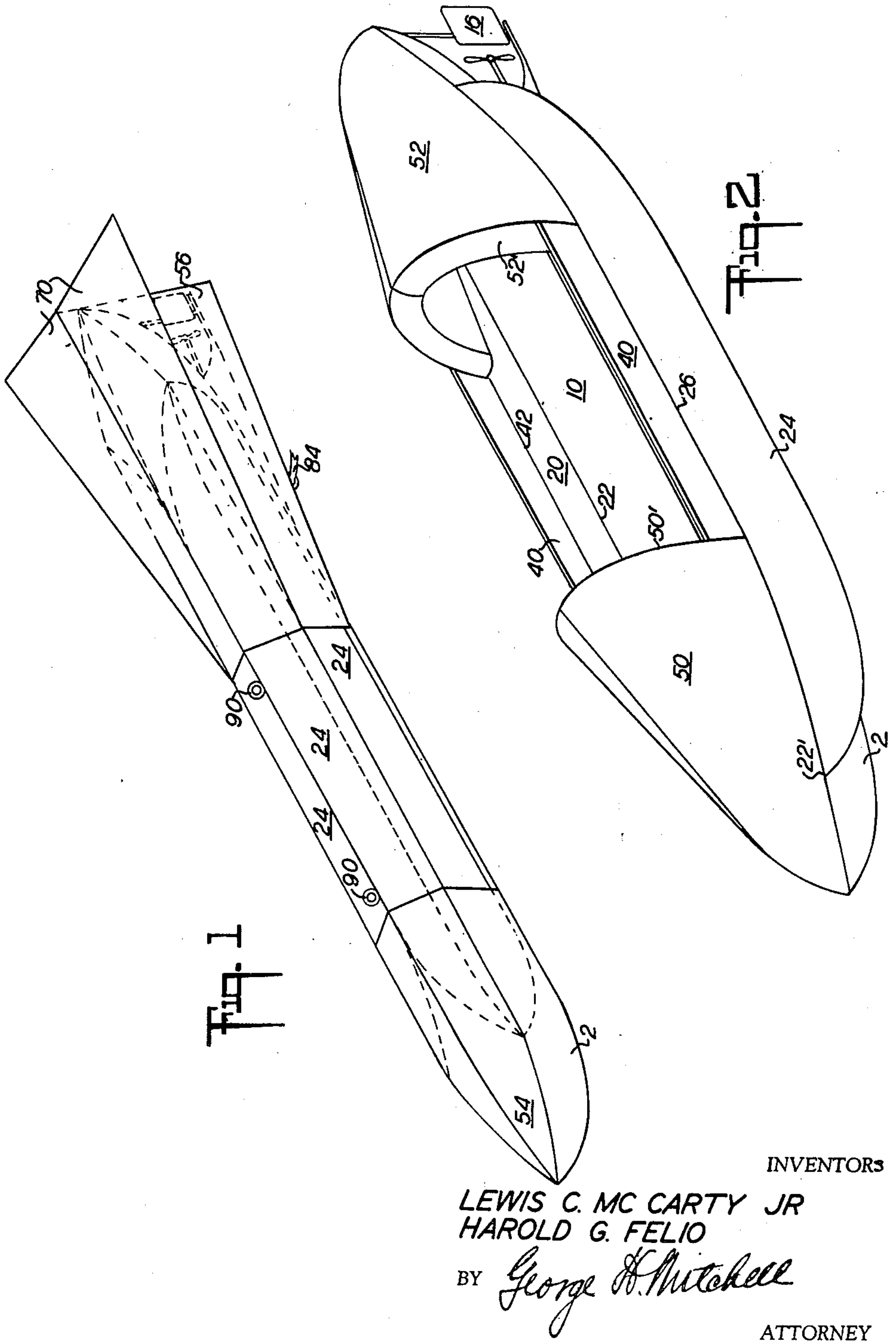
Fig. 1 is a perspective view of the lifeboat, in folded deflated position, as carried by the rescue aircraft and as it descends to the water.
Fig. 2 is a perspective view of the lifeboat on the water, in the unfolded and inflated condition.
Figure 3:
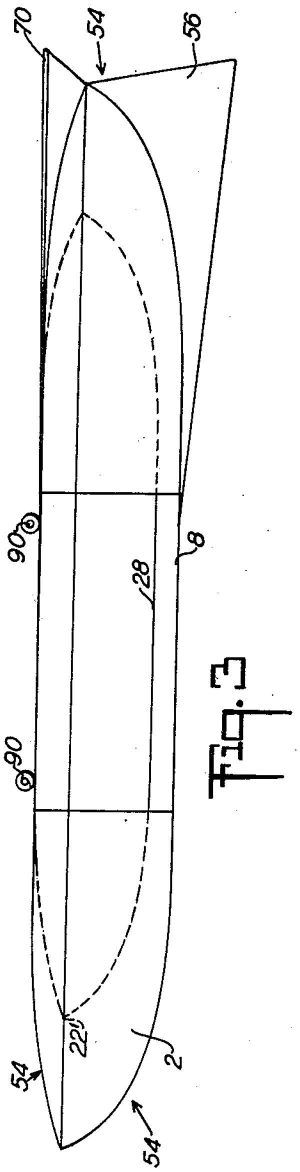
Fig. 3 is a side elevation of the lifeboat in folded deflated position.

The lifeboat, in folded position, with the box members 20 against the deck, and with the deflated sponson membranes fitting snugly over them, as in Figs. 1 and 7, with the gunwales in horizontal position, with the righting hoods deflated and flat on the deck and protected by their fairings, with fairings over the propeller and rudder in place and with the tail fins in place, is mounted on the bomb racks in the rescue aircraft.

The weight and dimensions of the boat are preferably such that it may be handled on a bomb dolly, for a land based carrier, or floated to position for a water based carrier. The boat as thus mounted is streamlined, and offers very little head resistance.

When the carrier reaches the scene of the disaster, the boat is released from the bomb rack close to the survivors, at a relatively low altitude, of the order of 25–75 feet, for example. This may be accomplished by ejecting the drogue which drags in the water, imposing considerable resistance to the forward travel, thus activating the boat release mechanism and then decelerates the speed of the boat; or by a sequence mechanism the drogue may be streamed just prior to mechanically or electrically releasing the boat itself. Instead of having the pull of the drogue release the boat, the drogue could be released first, and then the boat released by operation of the bomb release mechanism, manually or automatically.

As soon as the boat is in the water, the sponsons and righting hoods may be inflated, and the fairings and fins are jettisoned. As already noted, the boat is self buoyant even if deflated and could be steered to the survivors in deflated condition, where low visibility is desirable, as in war.

If the boat is still some distance from the survivors, the engine is started by radio from the rescue ship, and the boat is steered by radio to the survivors. The survivors climb aboard by the rope ladders 46.

While the preferred construction of the boat has been described in some detail, it should be understood that the invention is not limited to such details, but may be carried out in other ways.

We claim as our invention:

1. Air-sea rescue apparatus comprising, in combination, a rescue water craft dropable in midair over a body of water, said water craft including an elongated rigid hull having an interior compartment for survivors, said hull being provided with faired bow means at the forward end, flight control surface means, deceleration means to be streamed behind the craft in a fluid medium before the water craft is water-borne, and horizontally disposed inflatable buoyancy-altering means, said flight control surface means extending longitudinally so as to provide the water craft with predictable directional flight characteristics, said faired bow means being disposed so as to minimize drag in fluid mediums, said deceleration means being effective when streamed to retard the velocity of the water craft in fluid mediums, said buoyance-altering means being disposed so as to minimize drag when deflated and when inflated to increase the buoyancy of the water craft.

2. Air-sea rescue apparatus comprising, in combination, an elongated rescue water craft droppable in midair over a body of water, said water craft including a rigid hull having an interior compartment for survivors, said hull being provided in an upper portion with closure means for access to said compartment, faired bow means at the forward end of the hull, flight control surface means, deceleration means to be streamed behind the craft in a fluid medium before the water craft is water-borne, and horizontally disposed inflatable buoyancy-altering means, said flight control surface means extending longitudinally so as to provide the water craft with predictable directional flight characteristics, said faired bow means being disposed so as to minimize drag in fluid mediums, said deceleration means being effective when streamed to retard the velocity of the water craft in fluid mediums, said buoyancy-altering means being exteriorly disposed so as to minimize drag when deflated and being adapted when inflated to increase the buoyancy of the water craft and to position said closure means above the water.

3. Air-sea rescue apparatus comprising, in combination, a rescue water craft adapted to be dropped in midair over a body of water, said water craft having an inflexible elongated hull provided with a compartment for survivors, said hull being provided in an upper portion with access means for said compartment, flight control means including fluid brake and control surface means, and buoyancy-altering means, said flight control means being effective to provide the water craft with predictable directional gliding characteristics when dropped in midair, said buoyancy-altering means exteriorly disposed at the sides of the hull so as to minimize drag in a fluid medium when deflated and when inflated to increase the buoyancy of the hull and to position said access means above the water.

4. Air-sea rescue apparatus comprising, in combination, a rescue water craft adapted to be dropped in midair over a body of water, said water craft including an elongated hull structure provided with a compartment for survivors and access means for said compartment in an upper portion of the hull, directional flight control means including fluid brake and control surface means for said hull, buoyancy-altering means for the hull, and actuating means for said buoyancy-altering means, said flight control means being effective to guide said water craft in a predictable directed gliding fall into a body of water when released in midair, said buoyancy-altering means being normally disposed exteriorly of the sides of the hull structure so as to minimize drag in a fluid medium when in non-actuated condition and adapted in response to said actuating means to stabilize said hull when water-borne to maintain said access means in position for use by survivors.

5. Air-sea rescue apparatus comprising, in combination, an aircraft provided with bomb rack means, and a rescue water craft releasable in midair and adapted to be substituted for a bomb in operative engagement with said bomb rack means, said water craft including an inflexible elongated hull structure provided with a compartment for survivors and access means for said compartment, directional flight control means including fluid brake and control surface means for said hull structure, stabilizing means disposed on opposite sides of the longitudinal axis of said hull structure, and actuating means for said stabilizing means, said flight control means being effective to guide said water craft in predictable directional gliding flight into a body of water when released in midair, said stabilizing means being disposed so that when actuated said access means will be maintained above water when the hull is water-borne.

6. Air-sea rescue apparatus comprising, in combination, an aircraft, a rescue water craft, and means enabling said water craft to be releasably suspended in operative engagement with said aircraft, said rescue craft including hull structure having an inflexible streamlined framework for stable flight in midair provided with extensible buoyancy-increasing means adapted to transport survivors when water-borne, said hull structure being provided with directional flight control means disposed so as to guide said water craft in predictable directional gliding flight into a body of water when said water craft is released in midair.

7. Air-sea rescue apparatus comprising, in combination, a rescue water craft adapted to be released in midair over a body of water, said rescue craft including hull structure having an inflexible streamlined framework for stable flight in midair provided with extensible buoyancy-increasing means adapted to transport survivors when water-borne, said hull structure being provided with directional flight control means disposed so as to guide said water craft in predictable directional gliding flight into a body of water when said water craft is released in midair.

8. A lifeboat having a rigid hull provided with a well compartment, closure means for the compartment, inflatable buoyancy-altering means attached to the hull, and means for connecting the inflatable means to said closure means so that said closure means will be actuated in response to inflation of the buoyancy-altering means.

9. A lifeboat having an elongated rigid hull provided with a well compartment, closure means for the compartment, inflatable stabilizing means attached to the side of the hull, and means for connecting said stabilizing means to said closure means so that said closure means will be actuated in response to inflation of the stabilizing means.

10. A lifeboat having an inflexible hull structure provided with a hatch cover hinged to the hull and an airtight membrane disposed over portions of the surface of said hatch cover and the side of the hull structure, the peripheral edge of said membrane being sealed to the adjacent surface so that when air is introduced between the membrane and the surface of the hull and hatch cover force will be exerted to move the hatch cover and to distend the membrane to increase the buoyancy of the hull.

11. A lifeboat having an elongated inflexible hull structure provided with a pair of hatch covers, fore-and-aft hinge means connecting the hatch covers to the hull at their outer edges, a pair of airtight membranes disposed over portions of the exterior surface of the hull structure and said hatch covers, the peripheral edge of each membrane being sealed to the adjacent surface so that when air is introduced between the membranes and the surface of the hull and said hatch covers force will be exerted by said membranes to move the hatch covers and to distend outwardly the membranes to increase the lateral stability of the hull.

12. A lifeboat having an elongated hull whose cross-sectional configuration resembles an inverted triangle, the upper portion of said hull being divided into two lengthwise sections defined at the bottom by a horizontal plane and at the interior by a centrally disposed vertical plane, said upper lengthwise sections being hingedly connected to the lower section to provide outwardly opening hatch covers, an airtight membrane disposed over the surface of each of the hatch covers and a portion of the exterior surface of each side of the lower hull portion, said membrane conforming to the contour of the hull when the hatch covers are closed, said membranes being sealed to the inner edges of the hatch covers and along their peripheral edges sealed to the adjacent surface to permit inflation of the membranes, said membranes when inflated exerting force to rotate said hatch covers about their hinges to open position and distending the membranes to form sponsons.

13. Method of performing an air-sea rescue which includes the steps of transporting a submergible water rescue craft to the scene of rescue by aircraft, launching the rescue craft in mid-air in an attitude for sustained gliding flight into the water for submergence without damage to the rescue craft, decelerating the rescue craft to limit the force of impact when the rescue craft strikes the water but insufficient to prevent said gliding flight to the water, inflating a portion of said rescue craft to increase buoyancy after it strikes the water, and opening the rescue craft for access to its interior.

References Cited in the file of this patent

UNITED STATES PATENTS

| Number | Name | Date |
|---|---|---|
| 695,634 | Dickenson | Mar. 18, 1902 |
| 1,117,189 | Jackson | Nov. 17, 1914 |
| 1,603,711 | Peck et al. | Oct. 19, 1926 |
| 1,672,163 | Krammer | June 5, 1928 |
| 1,774,414 | Bleriot | Aug. 26, 1930 |
| 2,338,976 | Schutte | Jan. 11, 1944 |
| 2,407,666 | Kearney | Sept. 17, 1946 |
| 2,510,843 | Townshend | June 6, 1950 |
| 2,585,030 | Nosker | Feb. 12, 1952 |